United States Patent [19]
Watkins

[11] Patent Number: 5,996,348
[45] Date of Patent: Dec. 7, 1999

[54] DUAL POPPET WASTEGATE WITH DUAL COAXIAL SHAFTS

[75] Inventor: Billy Dean Watkins, Rancho Palos Verdes, Calif.

[73] Assignee: AlliedSignal Inc., Morristown, N.J.

[21] Appl. No.: 09/033,450

[22] Filed: Mar. 2, 1998

Related U.S. Application Data

[60] Provisional application No. 60/040,847, Mar. 17, 1997.

[51] Int. Cl.⁶ .................................................. F02D 23/00
[52] U.S. Cl. ............................................................ 60/602
[58] Field of Search ............................... 137/601; 60/602; 415/144

[56] References Cited

U.S. PATENT DOCUMENTS

| | | | |
|---|---|---|---|
| 4,530,640 | 7/1985 | MacInnes | 415/144 |
| 4,893,474 | 1/1990 | Miller et al. | 60/602 |
| 5,046,317 | 9/1991 | Satokawa | 60/602 |

FOREIGN PATENT DOCUMENTS

| | | |
|---|---|---|
| 2948089 | 6/1981 | Germany . |
| 3916221A1 | 11/1990 | Germany . |
| 57-137619 | 8/1982 | Japan . |
| 62-183033 | 11/1987 | Japan . |

*Primary Examiner*—Noah P. Kamen
*Attorney, Agent, or Firm*—Felix L. Fischer

[57] ABSTRACT

An improved wastegate valve for turbochargers having bifurcated exhaust gas inlets includes a first bypass port communicating with a first portion of the exhaust inlet, a first poppet which engages and seals a seat surrounding the first port, a second bypass port communicating with a second portion of an exhaust inlet, and a second poppet which engages and seals a seat surrounding the second port. Actuation of the poppets is accomplished by a first substantially tubular shaft supported for rotation about an axis and having a central bore and a second substantially tubular shaft extending through the central bore of the first shaft and supported therein for rotation about the axis. The two shafts are concurrently rotated by a lever arm which is connected to the first shaft, at an opposite end to the radial arm, with a weld bead which extends across the end face of the first shaft, the bore, and a coplanar end of the second shaft.

17 Claims, 2 Drawing Sheets

DUAL POPPET WASTEGATE WITH DUAL COAXIAL SHAFTS

CROSS REFERENCE TO RELATED APPLICATIONS

This application claims the benefit of the filing date of provisional application No. 60/040,847 having a filing date of Mar. 17, 1997 entitled Dual Poppet Wastegate with Dual Coaxial Shafts

BACKGROUND OF THE INVENTION

1. Field of the Invention

This invention relates generally to an exhaust gas bypass and wastegate valve arrangement for exhaust gas driven turbochargers. More particularly, the present invention provides dual, coaxial shafts for actuation of dual poppet valves on a wastegate for the divided exhaust gas inlets into the turbine housing of the turbocharger.

2. Description of the Related Art

Turbochargers are employed for boosting the pressure level of the intake air for an internal combustion engine. Engine exhaust is provided through an exhaust gas inlet in the turbocharger to spin a turbine wheel which is interconnected via a common shaft to a compressor rotor producing the pressurized charge air. The speed of rotation of the turbine and compressor are dependent on the speed and load of the engine and at high speed, high load operating ranges over pressurization of the charge air may occur. Excessive boost pressure is avoided in turbochargers through the use of a wastegate valve which opens to bypass some portion of the exhaust gas from the exhaust gas inlet around the turbine and directly to the turbine exhaust outlet.

In turbochargers used on engines which can be divided into two banks of cylinders, it has been found highly effective in improving engine and turbocharger performance to maintain separate exhaust gas inlet paths such that separate impulses of the exhaust gas from the two banks of cylinders will be transmitted separately to the turbine. This approach is commonly implemented through the use of a divided exhaust gas inlet. Wastegating of such a divided inlet requires two bypass ports controlled by a dual wastegate valve mechanism.

Dual wastegate valve designs to overcome problems arising from simultaneous opening and closing requirements for both outlet ports have been provided in Japanese Patent Application Laid-Open Publication No. 57-137619, Japanese Utility Model Application Laid-Open Publication No. 62-183033 and U.S. Patent No. 5,046,317, entitled Wastegate Valve for Turbocharger, and having a common assignee with the present application.

It is desirable to provide a wastegate valve mechanism which provides simultaneous opening and closing of dual poppets in an affirmative manner while maintaining the valves in a firmly closed position, when appropriate, to achieve maximum efficiency in transmitting pressure pulses to the turbine. While it is desirable to maintain the individual poppets seated tightly on their respective seats, it is also desirable to accommodate tolerance differences and distortion in the seats, and to absorb pulse loading on the poppets individually to allow reaction as two separate valves.

SUMMARY OF THE INVENTION

The present invention improves on the prior art devices and achieves the desired performance by providing dual coaxial shafts for support and actuation of the two valve poppets resting on individual seats to seal the wastegate ports. A wastegate valve incorporating the present invention includes a first bypass port communicating with a first portion of an exhaust inlet, a first poppet which engages and seals a seat surrounding the first port, a second bypass port communicating with a second portion of an exhaust inlet, and a second poppet which engages and seals a seat surrounding the second port.

Actuation of the poppets is accomplished by a first substantially tubular shaft supported for rotation about an axis and having a central bore and a second substantially tubular shaft extending through the central bore of the first shaft and supported therein for rotation about the axis. The first poppet is attached to the first shaft by an arm extending substantially radially from the first shaft, whereby rotation of said first shaft from a first position to a second position lifts the first poppet from sealing engagement with its seat to an open position. Similarly, the second poppet is attached to the second shaft, which extends beyond the termination of the first shaft, by an arm extending substantially radially from the second shaft whereby rotation of said second shaft from a first position to a second position lifts the second poppet from sealing engagement with its seat to an open position. The two shafts are concurrently rotated by a lever arm which is connected to the first shaft, at an opposite end to the radial arm, with a weld bead which extends across the end face of the first shaft, the bore, and a coplanar end of the second shaft.

BRIEF DESCRIPTION OF THE DRAWINGS

The details and features of the present invention will be more clearly understood with respect to the detailed description and drawings in which.

DETAILED DESCRIPTION OF THE INVENTION

Figure 1:
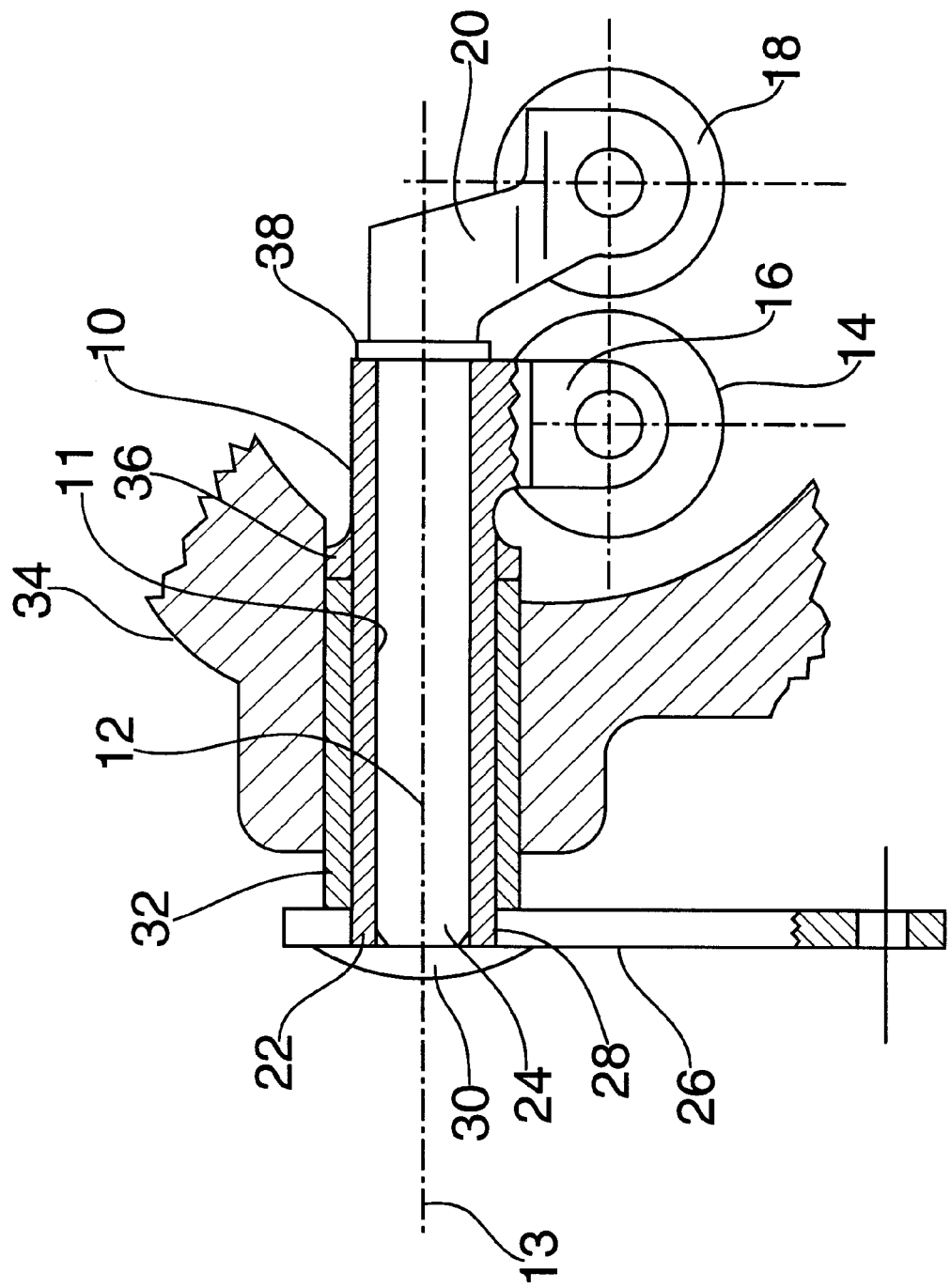
FIG. 1 is a section view of an embodiment of the invention showing details of the coaxial shafts, actuation attachment and poppet attachment.

Referring to the drawings, FIG. 1 shows an embodiment of the invention which includes a first shaft 10 which is substantially tubular and incorporates a bore 11. A second shaft 12 is received within the bore with a clearance fit. The first and second shafts are simultaneously rotatable on an axis 13. A first poppet 14 is attached to the first shaft by an arm 16 which extends, substantially radially with respect to the axis of rotation, from the first shaft. Similarly, a second poppet 18 is attached to the second shaft by an arm 20. Rotation of the shafts about the axis affirmatively moves the poppets from a closed position, seated on their respective valve seats to an open position. A rotation angle of significantly less than 90°, moves the poppets to leave a clear flowpath through the bypass ports of the wastegate valve.

The first and second shafts have substantially coplaner first ends 22,24 and an actuation lever 26 is attached to the first end of the first shaft. For the embodiment shown in the drawings, the lever incorporates an aperture 28 which receives the first end of the first shaft and a weld bead 30 extends over the lever, the first end of the first shaft and the first end of the second shaft, providing a rigid interconnection between the lever and the first ends of the shafts. Actuation of the lever rotates the two shafts simultaneously. In alternative embodiments, the lever is attached to the end of the second shaft which extends slightly beyond the first shaft and a common weld bead or a second weld rigidly secures the first and second shafts.

A bushing 32 supports the first shaft in a portion of the casting for the turbine housing 34. A machined land 36 or alternatively a welded washer, provides a longitudinal restraint and inner seal for the first shaft and the bushing while the lever engages the outer end of the bushing for opposing longitudinal restraint. A second machined land 38 or welded washer on the second shaft provides a seal for second shaft at the termination of the first shaft.

While constrained at their first ends for common actuation, the two shafts are torsionally independent allowing the shafts to separately accommodate tolerance buildup or deformation of the seats for the poppets and to separately react to pulse loading from the exhaust gas flowing in the two portions of the exhaust gas inlet to the turbine. The configuration of the present invention allows accurate positioning of the poppets with respect to the valve seats after multicyclic operation of the wastegate valve.

Figure 2:
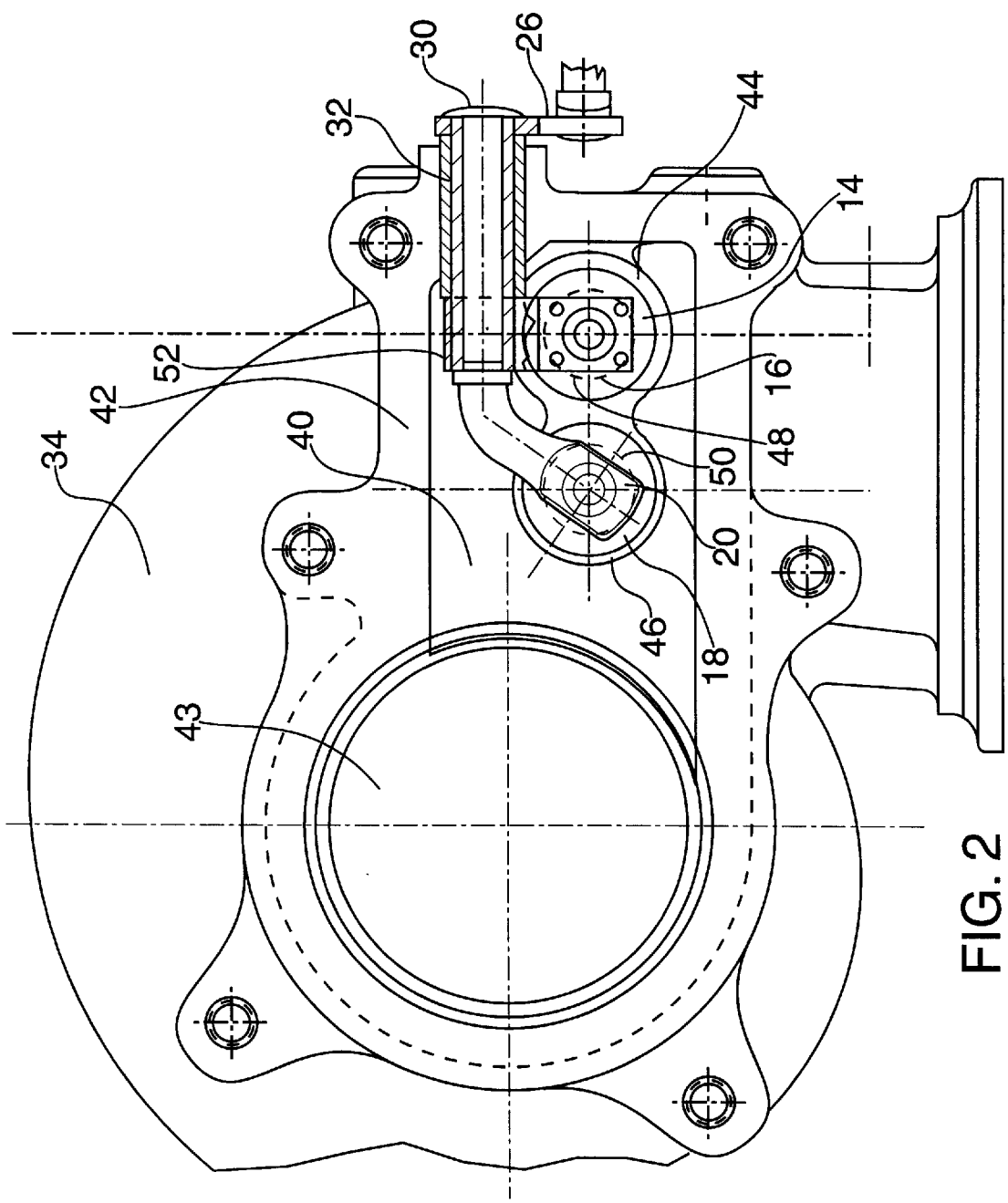
FIG. 2 is a partial section view of a second embodiment of the invention as installed on a turbocharger turbine housing.

FIG. 2 shows a slightly different embodiment of the invention as configured for use with a turbine housing having an integrated bypass channel 40. An end housing integrated with the turbocharger exhaust gas discharge port (not shown), attached to the mating land 42, seals and forms a portion of the bypass channel for wastegated exhaust gas flow into the gas stream from the turbine outlet 43. The wastegate valve poppets 14 and 18 are received in and seal seats 44 and 46 which surround bypass ports 48 and 50. The radial arm 16 attaching the first poppet to the first shaft, incorporates a sleeve 52 which receives and is attached to the first shaft and abuts the bushing thereby integrating the longitudinal restraint and seal for the first shaft and bushing with the attachment of the radial arm to the shaft. In alternative embodiments, a shaft seal is employed for sealing the first shaft and bushing such as that disclosed in U.S. Pat. No. 5,251,874 entitled Valve Shaft Seal and having a common assignee with the present application, the disclosure of which is incorporated herein by reference.

Having now described the invention in detail as required by the patent statutes, those skilled in the art will recognize modifications and substitutions to the specific embodiments disclosed herein. Such modifications and substitutions are within the scope and intent of the present invention as defined in the following claims.

What is claimed is:

1. A turbocharger wastegate valve comprising:
    a first bypass port communicating with a first portion of an exhaust inlet;
    a first poppet adapted for engaging and sealing a seat surrounding the first port;
    a second bypass port communicating with a second portion of an exhaust inlet;
    a second poppet adapted for engaging and sealing a seat surrounding the second port;
    a first substantially tubular shaft supported for rotation about an axis, said shaft having a central bore;
    a second substantially tubular shaft extending through the central bore of the first shaft and supported therein for rotation about the axis;
    means for attaching the first poppet to the first shaft, said means extending substantially radially from the first shaft, whereby rotation of said first shaft from a first position to a second position lifts the first poppet from sealing engagement with its seat to an open position;
    means for attaching the second poppet to the second shaft, said means extending substantially radially from the second shaft whereby rotation of said second shaft from a first position to a second position lifts the second poppet from sealing engagement with its seat to an open position; and
    means for concurrently rotating the first and second shafts.

2. A wastegate valve as defined in claim 1 wherein the means for concurrently rotating comprises:
    a lever arm attached substantially radially to at least one of said first and second shafts; and
    means for rigidly interconnecting the first and second shaft at a location distal from the means for attaching the first and second poppets.

3. A wastegate valve as defined in claim 2 wherein the means for rigidly interconnecting comprises a weldment.

4. A wastegate valve as defined in claim 3 wherein the first and second shafts terminate in first ends on a common plane and the weldment comprises a weld bead extending over the first ends.

5. A wastegate valve as defined in claim 4 wherein the lever arm extends substantially in the common plane and the weld bead extends to the lever arm for rigid interconnection of the first and second shafts and the lever arm.

6. A wastegate valve as defined in claim 4 wherein the lever arm includes an aperture receiving at least one of said first ends.

7. A wastegate valve as defined in claim 6 wherein the first shaft is rotationally supported by a bushing having a first end which engages the lever proximate the aperture for sealing and longitudinally restraining the shaft in the bushing and further comprising means for sealing and longitudinally restraining the first shaft at a second end of the bushing.

8. A wastegate valve as defined in claim 4 wherein a second end of the second shaft extends beyond a second end of the first shaft and the means for attaching the first poppet and second poppet extend from the first and second shafts proximate the second ends thereof.

9. A wastegate valve as defined in claim 8 further comprising means for sealing the bore in the first shaft at the second end of the first shaft.

10. A wastegate valve as defined in claim 9 wherein the means for sealing the bore comprises a land extending radially from the second shaft and engaging the second end of the first shaft.

11. An improved turbocharger wastegate valve having a first bypass port communicating with a first portion of an exhaust inlet, a first poppet adapted for engaging and sealing a seat surrounding the first port, a second bypass port communicating with a second portion of an exhaust inlet, a second poppet adapted for engaging and sealing a seat surrounding the second port, the improvement comprising:
    a first substantially tubular shaft supported for rotation about an axis, said shaft having a central bore;
    a second substantially tubular shaft extending through the central bore of the first shaft and supported therein for rotation about the axis;
    means for attaching the first poppet to the first shaft, said means extending substantially radially from the first shaft, whereby rotation of said first shaft from a first position to a second position lifts the first poppet from sealing engagement with its seat to an open position;
    means for attaching the second poppet to the second shaft, said means extending substantially radially from the second shaft whereby rotation of said second shaft from a first position to a second position lifts the second poppet from sealing engagement with its seat to an open position; and means for concurrently rotating the first and second shafts.

12. An improved wastegate valve as defined in claim 11 wherein the means for concurrently rotating comprises:

a lever arm attached substantially radially to at least one of said first and second shafts; and means for rigidly interconnecting the first and second shaft at a location distal from the means for attaching the first and second poppets.

13. An improved wastegate valve as defined in claim 12 wherein the means for rigidly interconnecting comprises a weldment.

14. An improved wastegate valve as defined in claim 13 wherein the first and second shafts terminate in first ends on a common plane and the weldment comprises a weld bead extending over the first ends.

15. An improved wastegate valve as defined in claim 14 wherein the lever arm extends substantially in the common plane and the weld bead extends to the lever arm for rigid interconnection of the first and second shafts and the lever arm.

16. An improved wastegate valve as defined in claim 14 wherein the lever arm includes an aperture receiving at least one of said first ends.

17. An improved wastegate valve as defined in claim 14 wherein a second end of the second shaft extends beyond a second end of the first shaft and the means for attaching the first poppet and second poppet extend from the first and second shafts proximate the second ends thereof.

* * * * *